United States Patent [15] 3,710,016
Fujio et al. [45] Jan. 9, 1973

[54] TELEVISION RECEIVER WITH FIELD INTENSITY INDICATOR

[72] Inventors: Yoshio Fujio; Yoshihiro Kitamura; Koji Mihara; Tsuneakira Hamada, all of Kyoto, Japan

[73] Assignee: Mitsubishi Denki Kabushiki Kaisha, Tokyo, Japan

[22] Filed: Aug. 7, 1970

[21] Appl. No.: 61,907

[52] U.S. Cl..........178/5.8 R, 178/DIG. 15, 325/455, 200/52 CP, 200/181, 340/258 C
[51] Int. Cl...........H04n 5/60
[58] Field of Search.............178/5.8, 5.8 A, DIG. 15; 325/455; 200/52, 181; 340/258 C; 317/123 P, 146

[56] References Cited

UNITED STATES PATENTS

| | | | |
|---|---|---|---|
| 3,571,501 | 3/1971 | Yamamoto | 178/5.8 R |
| 3,200,305 | 8/1965 | Atkins | 200/52 CP |
| 2,743,433 | 4/1956 | Parmet | 340/258 C |
| 2,904,630 | 9/1959 | Bruch et al. | 178/5.8 A |
| 3,194,975 | 7/1965 | Diamond | 200/52 CP |

*Primary Examiner*—Robert L. Griffin
*Assistant Examiner*—Richard P. Lange
*Attorney*—Robert E. Burns and Emmanuel J. Lobato

[57] ABSTRACT

The viewer touches an antenna for a television receiver to operate a switch circuit. Then pulses from a deflection circuit cooperates with an AGC voltage to produce a signal providing a measure of a field intensity at the antenna. The signal is displayed on the picture tube as a vertical or horizontal band. The antenna is moved to and fixed at its position where the band has the narrowest width.

5 Claims, 28 Drawing Figures

TELEVISION RECEIVER WITH FIELD INTENSITY INDICATOR

BACKGROUND OF THE INVENTION

This invention relates to a television receiver, and more particularly to improvements in a device for displaying a field intensity at a receiving antenna involved.

It has been previously the practice to determine the location of the receiving antenna for television receivers by changing the direction and/or position of the antenna while the viewer observes a variation in quality of the particular received picture and orienting the antenna at a position where the picture received is found to be nearly of best possible quality. With that measure, however, it is not easy to visually determine the best possible position of the antenna for the reason that, as the picture received itself is always varying any delicate change in the picture's quality due to a field intensity at the particular receiving point is very difficult to be confirmed. Particularly for portable television receivers the receiver itself is in most cases moved from one to another position. Also it is required to re-adjust the antenna through the directivity thereof after each switching of the broadcasting station. Therefore a very troublesome problem has been encounter in obtaining the position of the antenna for the best reception.

In order to solve that problem, television receivers might be additionally provided with a circuit for displaying a field intensity at a receiving antenna involved. Since the display circuit is not required to be operated in the normal reception of the televised information a source switch or its equivalent has been necessary, in addition to the switch for operating the television receiver, disposed to turn on and off that circuit. However such a source switch has been required to be operated each time the particular field intensity at the receiving antenna or the directivity of the antenna is to be determined. Such an operation is inconvenient as well as troublesome and can be considered to be one of the causes for receiving televised information while the particular reception remains poor.

In order to alleviate the inconvenient troublesome operation as above described, it may be attempted to operate a circuit for displaying a field intensity at a receiving antenna by means of an impedance to ground of the antenna caused by touching it with the viewer. This measure renders the input impedance of the display circuit extremely high resulting in complicated construction and high cost of the circuit.

SUMMARY OF THE INVENTION

Accordingly it is an object of the invention to provide a television receiver comprising a new and improved display device for readily sensing location of an antenna involved for the best reception.

It is another object of the invention to provide a television receiver comprising a new and improved circuit for displaying a field intensity at a receiving antenna involved so as to indicate on the screen of the associated picture tube the location of the antenna for the best reception by a width of a black band.

It is still another object of the invention to provide a television receiver comprising a display circuit for displaying a field intensity at a receiving antenna involved and an automatic switch circuit responsive to the touching of the viewer with the antenna to operate the display circuit.

It is a further object of the invention to provide a new and improved television receiver comprising a switch circuit operative in response to the touching of the viewer with a receiving antenna involved, and, not adversely affect the input circuit to the receiver thereby to permit the latter to be stably operated.

It is an additional object of the invention to provide a television receiver comprising an automatic switch circuit operative with either of sources of alternating and direct currents.

The invention accomplishes the above cited objects by the provision of a television receiver comprising a receiving antenna for receiving an electromagnetic wave, a tuner for tuning the electric wave received by the receiving antenna to a desired one of broadcasting stations, a video circuit for converting a signal from the tuner to predetermined signals a cathode ray tube, means for supplying the predetermined signal to the cathode ray tube, and a deflection circuit for scanning the screen of the cathode ray tube, characterized by a switch circuit including an electric circuit formed of an impedance caused by touching the antenna with a human body, the receiving antenna thereby to produce an output, a display control circuit responsive to the output from the electric switch circuit to produce an output signal in accordance with a field intensity at the receiving antenna, and circuit means for supplying the signal from the display control circuit to the video circuit.

Preferably the display control circuit means may have applied thereto an AGC voltage and at least one of a pulse with positive polarity and a pulse with negative polarity produced by the deflection circuit.

Advantageously, there may be provided an impedance matching transformer as the preceding stage to the tuner, and a capacitor connected between the receiving antenna and the impedance matching transformer.

BRIEF DESCRIPTION OF THE DRAWINGS

These and other objects and advantages of the invention will become more apparent from the following detailed description and the accompanying drawings in which.

DESCRIPTION OF THE PREFERRED EMBODIMENTS

Figure 1:
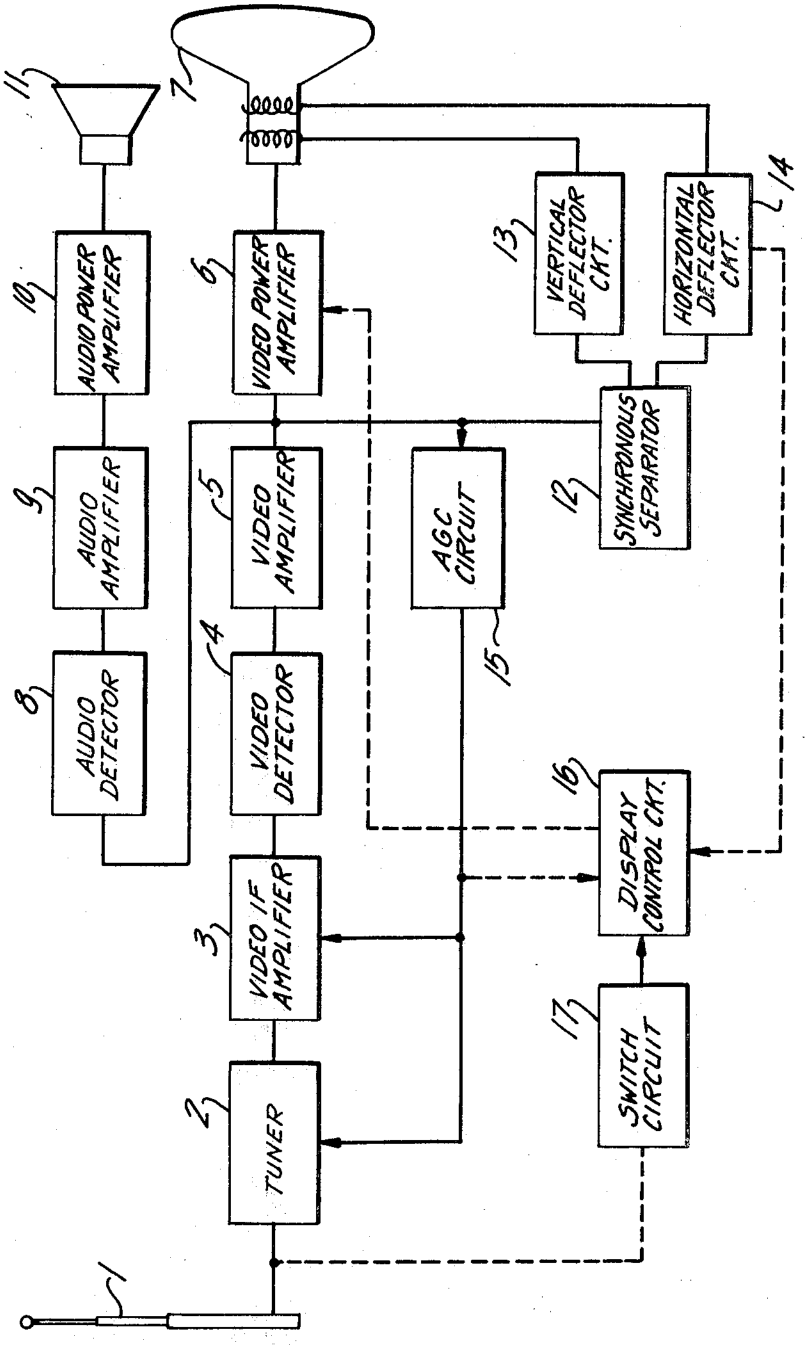
FIG. 1 is a block diagram of a television receiver embodying the principles of the invention.

Referring now to the drawings and FIG. 1 in particular, it is seen that an arrangement disclosed herein comprises a receiving telescopic antenna 1 of rod-shape, a tuner 2, a video intermediate frequency (IF) amplifier 3, a video detector 4, a video amplifier 5, a video power amplifier 6 and a cathode ray tube or a picture tube 7 connected in series circuit relationship in the named order. The picture tube 7 displays the output signal from the video power amplifier 6 on its screen in the well known manner.

The video amplifier 5 is also connected to an audio channel including an audio detector 8, and audio amplifier 9, an audio power amplifier 10 and a loudspeaker 11 connected in series circuit relationship in the named order. The loudspeaker 11 reproduces the audio information in the conventional manner.

The video amplifier 5 is further connected to a synchronizing signal separator 12 for separating a synchronizing signal from the output from the same. The synchronizing signal separator 12 is then connected to a vertical and a horizontal deflection circuit 13 and 14 respectively, the outputs from which are applied to the respective deflection yokes operatively coupled to the picture tube 11. The video amplifier 5 is shown in FIG. 1 as being also connected to an automatic gain control (AGC) circuit 15 for detecting the output from the video amplifier 5 to supply the detected output back to both the tuner 2, and the video IF amplifier 3 for the purpose of maintaining a fixed output from the video amplifier 5 regardless of any variation in field strength at the receiving antenna 1.

All the components as above described are of conventional design and need not be further described.

According to the principles of the invention there are provided a display control circuit 16 for controlling the display of a field strength at the antenna 1 and an automatic switch circuit 17 connected to the display control circuit 16 to turn on and off the latter. As shown by dotted lines in FIG. 1, the display control circuit 16 is connected to the output of the AGC circuit 15 while it is connected so as to produce an output voltage in accordance with a signal from the horizontal deflection circuit 14. The output voltage from the display control circuit 16 is then applied to the video power amplifier 6 for display on the picture tube 11. The switch circuit 17 is connected to the receiving antenna 1.

Figure 2:
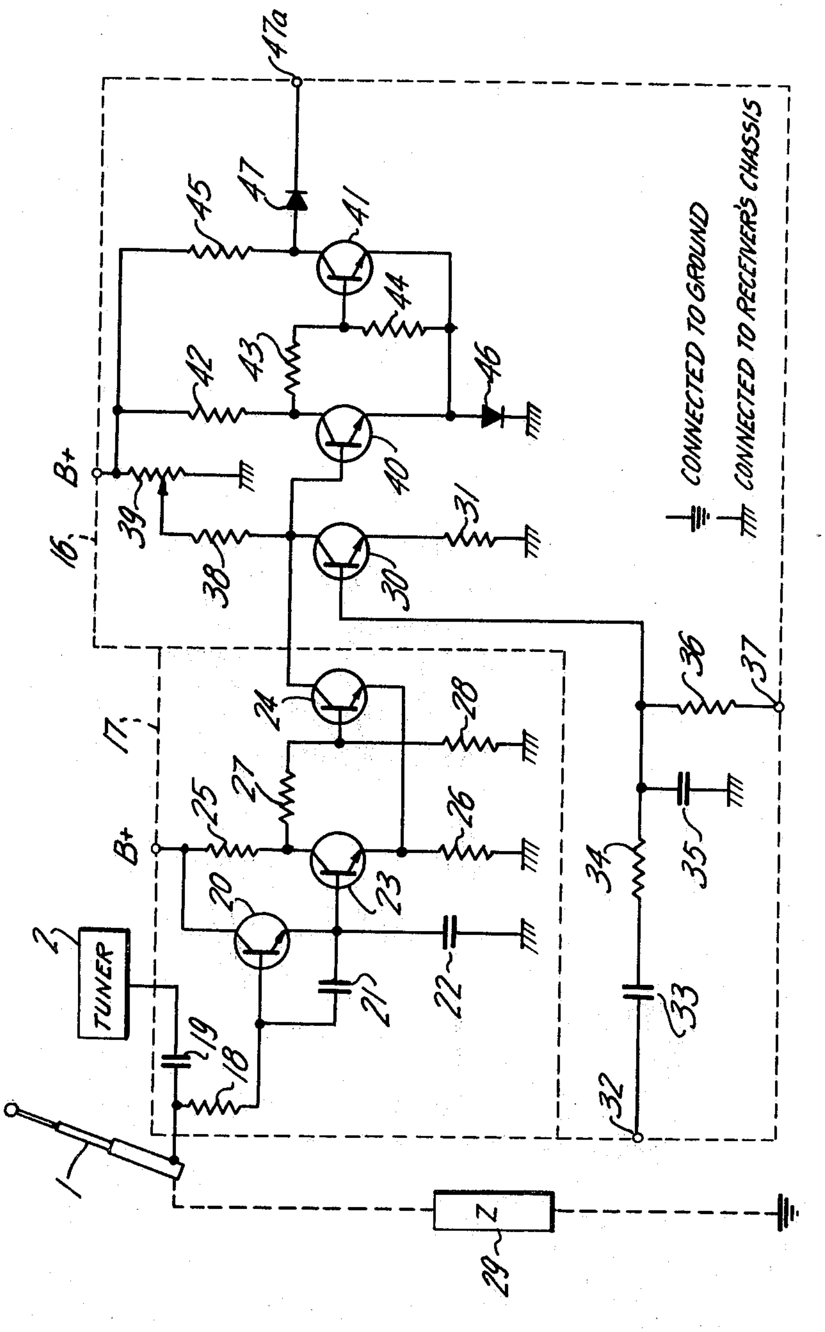
FIG. 2 is a wiring diagram of the switch and display control circuits shown in FIG. 1.

The display control circuit 16 and the switch circuit 17 may preferably have circuit configurations as shown in FIG. 2 wherein like reference numerals designate the components identical to those illustrated in FIG. 1. As shown in FIG. 2, the switch circuit 17 comprises a resistor 18 and a capacitor 19 connected to the receiving antenna 1. The capacitor 19 is connected to the tuner 2 and the resistor 18 is connected to a base electrode of an amplifying transistor 20 including an emitter electrode connected to its base electrode through a capacitor 21 and also through a smoothing capacitor 22 to a point of reference potential such as a chassis for the television receiver proper. The transistor 20 includes a collector electrode connected to a source terminal B+ representing a source of direct current. The emitter electrode of the transistor 20 is further connected to a Schmitt type triggering circuit including a pair of transistors 23 and 24 and the associated resistors 25 through 28 interconnected as shown in FIG. 2.

Normally the transistor 23 is in its OFF state while the transistor 24 is in its ON state and a current flows through the following current path:

terminal B+ — resistor 25 — resistor 27 — — transistor 24 — resistor 26. Therefore the transistor 24 has normally a low voltage at the collector electrode. Under these circumstances if it is desired to adjust the location of the receiving antenna 1 then a viewer can touch the antenna 1 with his hand. This causes an impedance 29 between the antenna 1 and ground as shown by dotted line in FIG. 2 whereby a voltage substantially equal o one half cycle of the source voltage forwardly biases the transistor 20 across the emitter and collector electrodes thereof through the impedance 29 and the resistor 18 to turn it on. That biasing voltage has its polarity dependent upon the connection of the associated plug socket (not shown) to a source of alternating current and is applied to the transistor 20 without any modification.

With the transistor 20 put in its ON state its emitter electrode has flowing therethrough a half wave rectified, amplified direct current. This direct current is smoothed by the smoothing capacitor 22 and supplied to the base electrode of the transistor 23 to turn it on. Therefore the transistor 23 decreases in collector potential but it increases in emitter potential with the result that the voltage applied to the transistor 24 causes a decrease in base potential and an increase in emitter potential thereof to turn the transistor 24 off. Therefore the transistor 24 has an increased potential at its collector electrode which is, in turn, applied to the succeeding display control circuit 16. The operation of the switch circuit 17 will be described in more detail hereinafter.

In order to display a field intensity at the receiving antenna 1, the display control circuit 16 comprises a transistor 30 including a collector electrode connected to the collector electrode of the transistor 24 of the switch circuit 17 and an emitter electrode connected through a resistor 31 to the point of reference potential as above described. The transistor 30 includes a base electrode connected to one input terminal 32 through a dc blocking capacitor 33 and integrating network consisting of a resistor 34 and a capacitor 35 and also through a resistor 36 to the other input terminal 37. The collector electrode of the transistor 30 is also connected to a source terminal B+ through a resistor 38 and a potentiometer 39 for controlling the operative level of the circuit 16 and further to a Schmitt type triggering circuit including a pair of transistors 40 and 41 and the associated resistors 42, 43, 44 and 45 interconnected as shown in FIG. 2. The emitter electrodes of the transistors 40 and 41 are connected together to the point of reference potential as above described through a semiconductor diode 46 while the collector electrode of the transistor 41 is connected through a semiconductor diode 47 to an output terminal 47*a*.

A collector pulse from the horizontal deflection circuit 14 is supplied to the input terminal 32 (see FIG. 1) and deprived of the direct current component by the blocking capacitor 33 after which it is integrated by the integrating network 34—35 for the application to the base electrode of the transistor 30. In addition, an AGC voltage from the AGC circuit 15 is supplied to the input terminal 37 (see FIG. 2) and is applied through the resistor 36 to the base electrode of the transistor 30 in superposed relationship with respect to the collector pulse through the input terminal 32. The output terminal 47*a* is connected to the video power amplifier 6 (see FIG. 1), for example an emitter electrode of a transistor forming an input thereto.

In the normal state in which the viewer does not touch the antenna 1 to maintain the collector potential of the transistor 24 low, the transistors 30 and 40 are in their OFF state to maintain a high potential at the base electrode of the transistor 41. This brings the transistor 41 in its ON state in which a current flow through the following current path:

terminal B+ — resistor 45 — transistor 41 — diode 46. Under these circumstances, the transistor 41 becomes low in collector potential and can not supply the output to the video power amplifier 6. In other words, the display control circuit 16 provides no output. It is noted that a potential difference between the output of the display control circuit 16 and the input of the video power amplifier 6 is such that the potential at the collector electrode of the transistor 41 is lower during its conduction.

Figure 3:
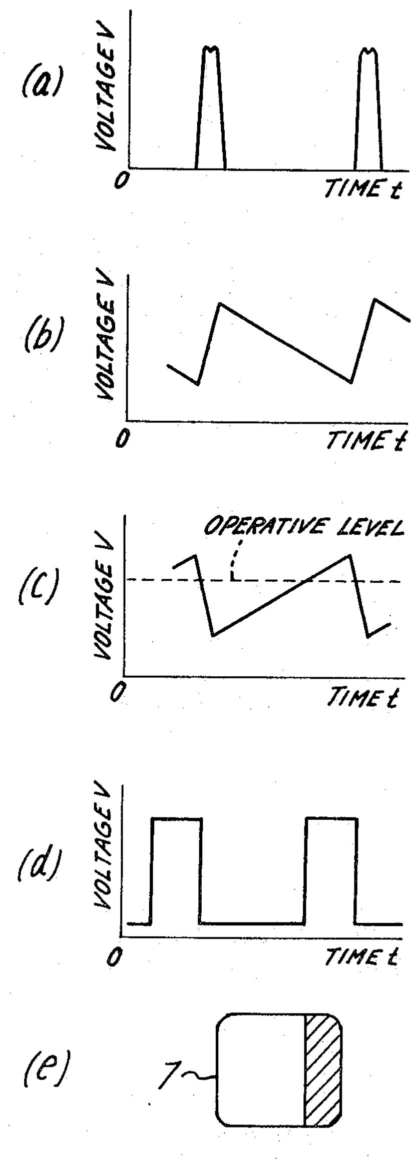
FIG. 3*a* through *d* are views of forms developed at various points on the circuits shown in FIG. 2.
FIG. 3*e* is a view illustrating a display on the cathode ray tube of a field intensity at one location of the receiving antenna shown in FIG. 1 corresponding to the waveforms shown in FIG. 3*a* through *d;*
Figure 5:
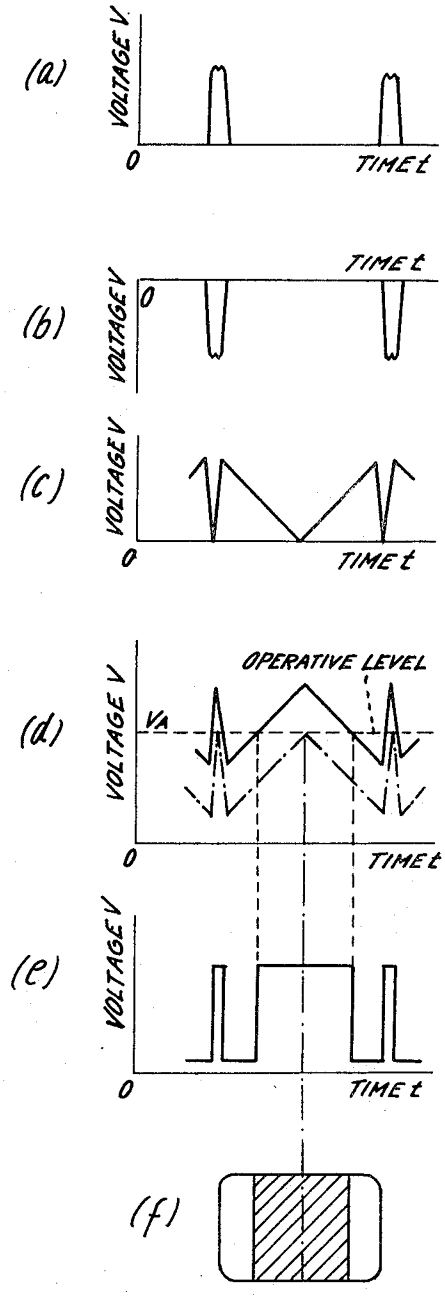
FIGS. 5*a* through *e* are views of waveforms developed at various points on the circuit shown in FIG. 4.
FIG. 5*f* is a view similar to FIG. 3*e* but corresponding to the waveforms shown in FIGS. 5*a* through *e;*

If the viewer touches the antenna 1 with the hand for the purpose of adjusting the location of the antenna the transistor 24 increases in collector potential to provide an output at the collector electrode as above described. This causes an increase in potential at the collector electrode of the transistor 30 to put it in operation. On the other hand, the horizontal deflection circuit 14 supplies to the input terminal 32 collector pulses having the waveform as shown in FIG. 3*a*. These pulses are integrated into a sawtooth waveform such as shown in FIG. 3*b* by the integrating circuit 34—35 and then applied to the base electrode of the transistor 30. At the same time the AGC voltage from the AGC circuit 15 is being applied to the same base electrode through the input terminal 37 and the resistor 36.

That sawtoothed waveform is amplified by the transistor 30 and converted to a waveform as shown in FIG. 3*c*. The waveform of FIG. 3*c* is then applied to the base electrode of the transistor 40. It is now assumed that the Schmitt type triggering circuit has its operating level as shown by dotted line in FIG. 3*c* by adjusting the level adjusting potentiometer 39. That is, for any voltage whose level is below that operating level, the transistor 40 is in its OFF state and the transistor 41 is in its ON state because of an increase in base potential thereof. Therefore the transistor 41 decreases in collector potential to prevent the display control circuit 16 from providing an output.

However, for any voltage whose level is above the operating level as shown in FIG. 3*c*, the transistor 40 is turned on to decrease the potential at the base electrode of the transistor 41 to put the latter in its OFF state. This causes the potential at the collector electrode of the transistor 41 to increase whereby the display control circuit 16 provides an output.

From the foregoing it will be appreciated that the display control circuit 16 produces a waveform as shown in FIG. 3*d*. That waveform is supplied to the video power amplifier 6 to display a vertical black band on the screen of the picture tube as shown in the hatched righthand portion in FIG. 3*e*.

With the field intensity at the receiving antenna low, the AGC voltage provided by the AGC circuit becomes low to decrease the direct current voltage superposed on the sawtooth waveform applied to the base electrode of the transistor 30. This results in an upward displacement of the sawtoothed waveform applied to the transistor 40 with respect to the operative level as shown in FIG. 3*c*. Therefore the transistor 41 has a longer time interval for which it is in the OFF state, or to cause the display control circuit 16 to provide the output. This results in an increase in width of the black band displayed on the picture tube 7.

With the field intensity increased by varying the location of the antenna 1, the AGC voltage becomes higher. This causes an increase in direct current voltage superposed on the sawtooth waveform applied to the transistor 30 leading to a downward displacement of the sawtooth waveform supplied to the transistor 40 with respect to the operative level as above described. This results in a decrease in time interval for which the transistor 41 is in its OFF time to cause the display control circuit to provide the output. As a result, the black band displayed on the picture tube 7 decreases in width.

From the foregoing it will be appreciated that the location of the antenna 1 for the best reception can be determined by observing the black band on the picture tube. After the antenna has been adjusted to its position for the best reception the viewer's hand can be removed from the antenna whereupon the black band disappears from the picture tube.

While the invention has been described in terms of the collector pulses of FIG. 3*a* supplied to the input terminal 32 it is to be noted that an automatic frequency control (AFC) pulses with negative polarity may be equally utilized to practice the invention. In the latter case, a vertical black band is displayed on the picture tube on the lefthand portion rather than on the righthand portion of its screen as viewed in FIG. 3*e*.

Figure 4:
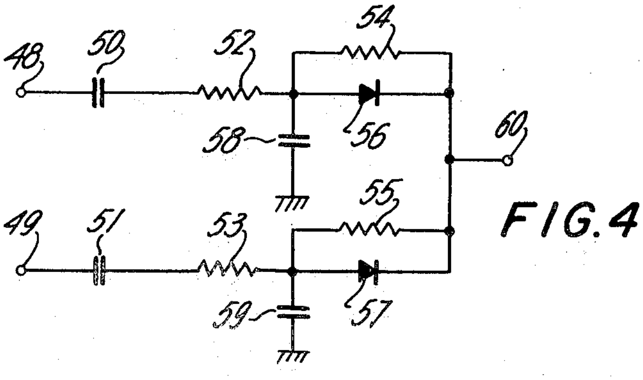
FIG. 4 is a circuit diagram of a modification of the input circuit to the display control circuit shown in FIG. 2.

FIG. 4 shows a modification of the input circuit connected across the input terminal 32 and the base electrode of the transistor 30 as shown in FIG. 2. As shown in FIG. 4, an input terminal 48 is connected to a dc blocking capacitor 50 subsequently connected to a resistor 52. Then the resistor 52 is connected to a parallel combination of a resistor 54 and a semiconductor diode 56 and also through a capacitor 58 to the point of reference potential as previously described. A separate input terminal 49 is connected to a network identical to that just described and the components therefor are designated by the reference numerals following the even reference numerals for the corresponding components of the network just described. For example, the resistor 53 and the capacitor 59 correspond to the resistor 52 and the capacitor 58 forming an integrating network. Both parallel combinations of resistor and diode are connected at the other ends to a common terminal 60 adapted to be connected to the base electrode of the transistor 30 (see FIG. 2).

The input terminal 48 has applied thereat collector pulses as shown in FIG. *5a* (which are identical to those shown in FIG. *3a*) while the input terminal 49 has applied thereat AFC pulses as shown in FIG. *5b*. Both pulse trains are free from the direct current components by means of the capacitors 50 and 51 and integrated by the integrating circuits including the resistors 52 and 53 and the capacitors 58 and 59 respectively. The integrated pulses are combined with each other through the diodes 56 and 57 to form at the output terminal 60 an output waveform as shown in FIG. *5c*. After having superposed the AGC voltage, the output waveform is applied to the base electrode of the transistor 30 (see FIG. 2) to operate the display control circuit 16 in the manner as above described in conjunction with FIGS. 2 and 3. Then the base electrode of the transistor 40 has supplied thereto a waveform as shown in FIG. *5d*. Assuming that the operative level has been set to a value of $V_A$ as shown in FIG. *5d*, the output terminal 47a (see FIG. 2) provides a voltage waveform as shown in FIG. *5e*. That waveform is supplied to the video power amplifier 6 (see FIG. 1) to display a black band on the picture tube on the central portion of its screen as shown on the hatched portion in FIG. *5f*.

With the field intensity at the receiving antenna low, the AGC voltage is also low so as to upwardly displace the waveform supplied to the transistor 40 as shown by solid line in FIG. *5d*. This leads to an increase in time interval for which the display control circuit provides the output. That is the displayed black band is widen.

On the other hand, if the field intensity increases, the abovementioned waveform is downwardly displaced as shown by dot-and-dash line in FIG. *5d*. This causes the displayed black band to be narrower. Alternatively the black band may fully disappear from the picture tube.

If the polarity of the diodes 56 and 57 are reversed from that illustrated in FIG. 4 then the display on the picture tube is also inverted.

The arrangement of FIG. 4 is more advantageous than that shown in FIG. 2 in that a display for the field intensity is effected on the central portion of the screen of the picture tube to easily observe the display.

The operation of the switch circuit as shown in FIG. 2 will now be described in more detail with reference to FIGS. 6 through 9. Only for the purpose of illustration it is assumed that the television receiver is connected to an external source of electric power, that is, a source of alternating current.

Figure 6:
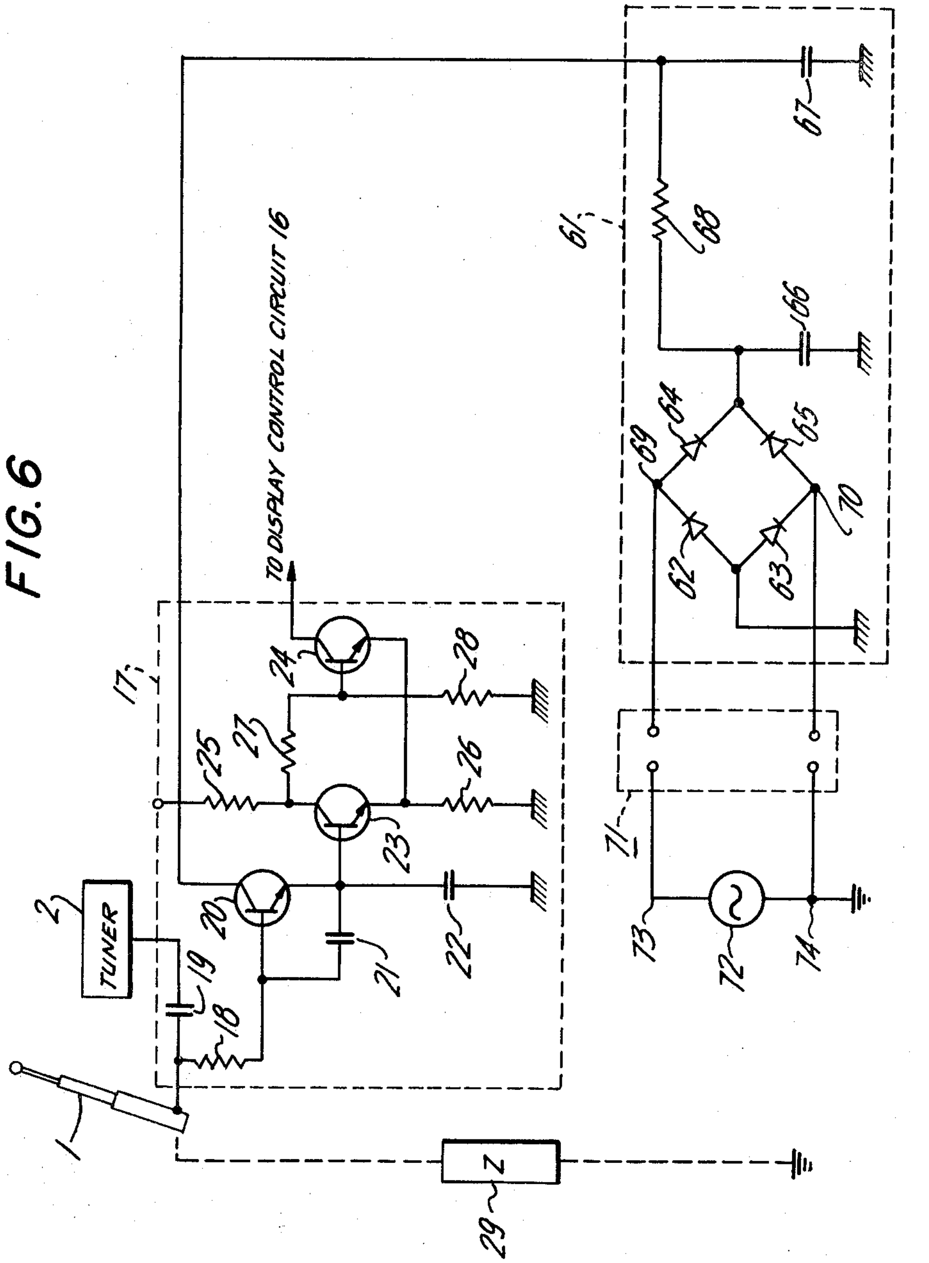
FIG. 6 is a fragmentary wiring diagram of the switch circuit shown in FIG. 2 and a source circuit suitable for use in a television receiver embodying the principles of the invention.

FIG. 6 shows the switch circuit 17 and a power supply circuitry generally designated by the reference numeral 61. The switch circuit 17 is the same as shown in FIG. 2 and the power supply circuitry 61 comprises a full-wave rectifier bridge consisting of semiconductor diodes 62, 63, 64 and 65, and a $\pi$ type filter circuit including a pair of parallel capacitors 66 and 67 and a series resistor 68. The junction of the resistor 68 and the capacitor 67 is connected to the B+ terminal for the switch circuit 17. However, it is to be understood that the junction is connected to other source terminals for the various components of the receiver although they are not illustrated. The capacitor 68 is connected at the other end to the point of reference potential as previously described as is the capacitor 66. The rectifier bridge includes a pair of direct current output terminals connected to the filter circuit and a pair of alternating current input terminals 69, 70 connected to a plug socket 71. Then the plug socket 71 is connected to a source of alternating current 72 including one end 73 and the other end 74 connected to ground.

In FIGS. *7a* and *b* wherein like reference numerals designate the components identical to those shown in FIG. 6, there is illustrated one portion of an equivalent circuit to the arrangement of FIG. 6 with the plug socket 71 connected to the source 72 to the input terminal 70 of the rectifier bridge. FIG. *7a* shows the case in which the source 72 has developed thereacross a positive half cycle of alternating current with respect to the point of reference potential or the receiver's chassis as shown on the lefthand portion thereof while FIG. *7b* shows the case in which the source 72 has developed thereacross a negative half cycle of alternating current with respect to the point of reference potential as shown on the lefthand portion thereof.

In FIG. *7a* a very low voltage equal to a forward voltage drop across the rectifying diode 63 (see the arrow *i* beside that diode) reversely biases the transistor 20 across the base and emitter electrodes through the impedance 29 relative to ground of the antenna 1 caused by touching the antenna by the viewer and the input resistor 18. Therefore the transistor 20 remains inoperative.

In FIG. *7b*, however, a voltage substantially equal to the source voltage forwardly biases the transistor 20 across the base and emitter electrodes through the impedance 29 and the resistor 18 to be turned on. Therefore, the transistor 20 is put in its operative or ON state. This results in a flow of amplified half-wave direct current through the emitter electrode of the transistor 20 causing the transistor 24 to provide an output as previously described.

Figure 8A:
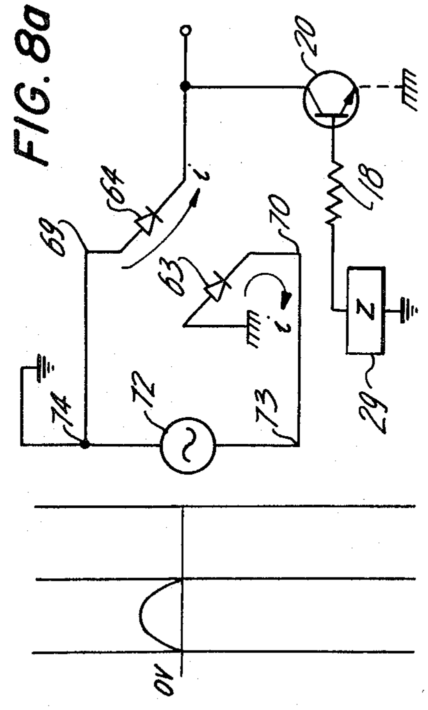
FIGS. 8*a* and *b* are views similar to FIGS. 7*a* and *b* respectively but illustrating the source of alternating current having its grounded terminal connected to the end of the rectifier circuit different from that in FIG. 7.
Figure 8B:
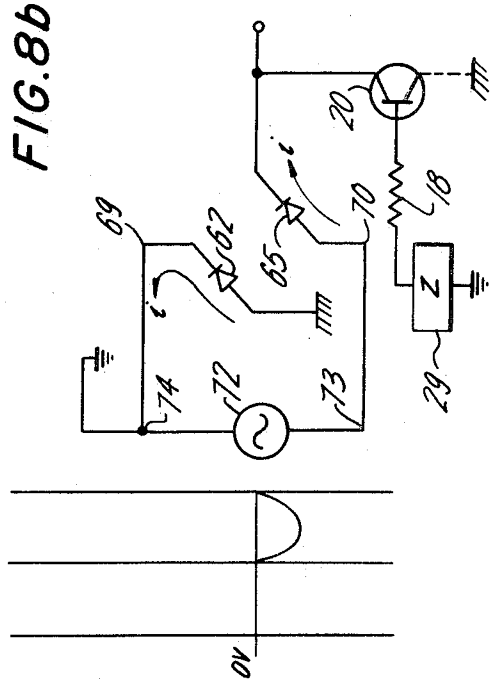
Figure 7A:
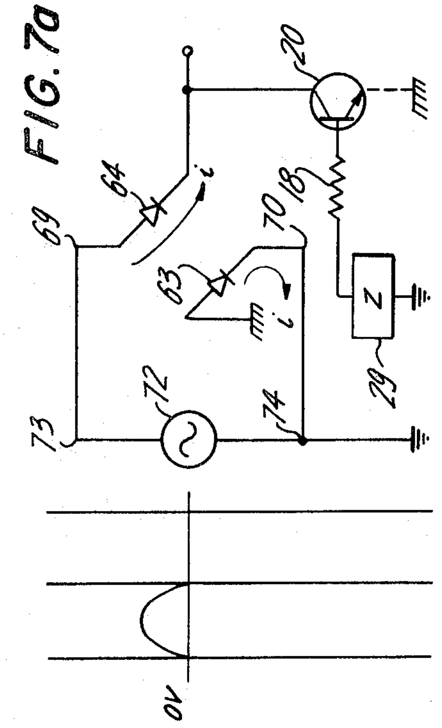
FIGS. 7*a* and *b* are schematic circuit diagrams useful in explaining the operation of the arrangement shown in FIG. 6 with the applied waveforms illustrated on the lefthand portion.
Figure 7B:
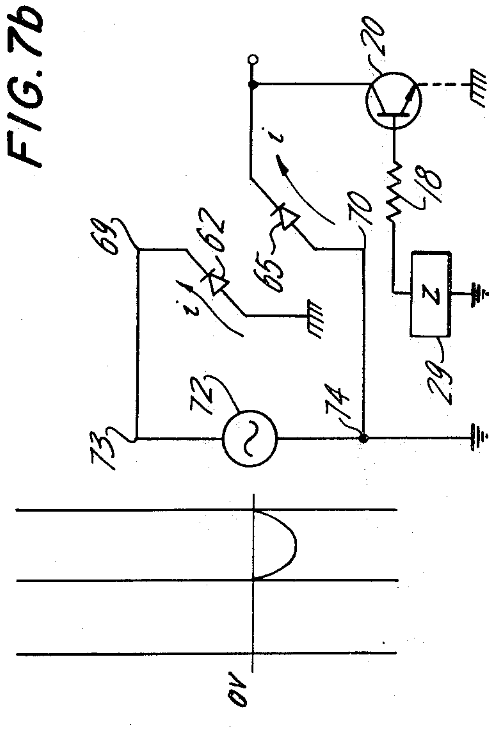

An arrangement shown in FIG. *8a* or *b* is similar to that illustrated in FIG. *7a* or *b* respectively excepting that the plug socket 71 is connected to the source 72 so as to connect the grounded terminal 74 to the input terminal 69 of the rectifier bridge. In FIG. 8 like reference numerals have been employed to identify the components identical to those shown in FIG. 7. In FIG. *8a* corresponding to FIG. *7a*, a voltage substantially equal to the source voltage forwardly biases the transistor 20 across the base and emitter electrodes through the impedance 29 relative to ground and the input resistor 18 to put that transistor in its ON state as in FIG. 7*b*. In FIG. 8*b* corresponding to FIG. 7*b*, however, a very low voltage equal to a forward voltage drop across the diode 62 reversely biases the transistor 20 across the base and emitter electrodes as in FIG. 7*a* to maintain that transistor inoperative.

From the foregoing it will be appreciated that regardless of which of the input terminals of the rectifier bridge is connected to the grounded end of the source, the viewer can touch the receiving antenna to operate the transistor 20 through the impedance 29 relative to ground and the resistor 18.

Figure 9:
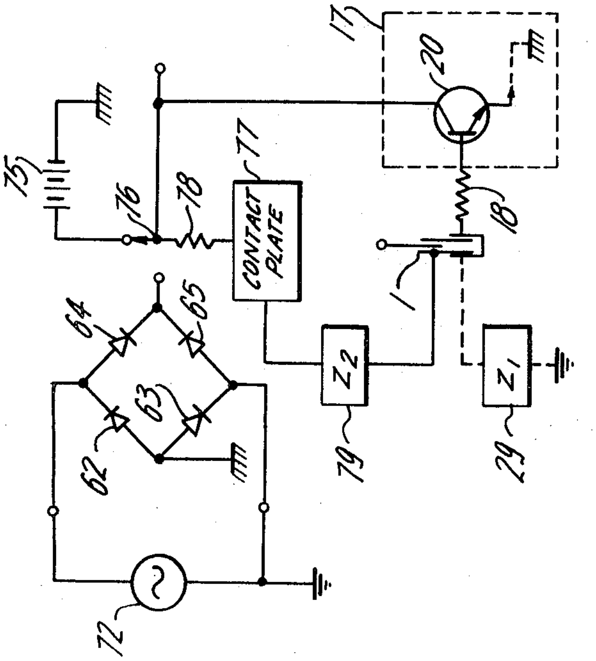
FIG. 9 is a fragmentary diagram of a modification of the switch circuit suitable for use in a television receiver compatible with an external source of alternating current and a source of a battery direct current disposed in the receiver.

In order to electrically isolate the receiving antenna 1 from the transistor 20 in the normal operation of the receiver, the high frequency input to the resistor 18 can be of a high resistance magnitude imparting a high magnitude of resistance to the input resistor 18. Also any variation in field intensity at the receiving antenna caused by grasping it with the viewer's hand can be eliminated by interposing any suitable material high in electric resistance therebetween.

Where a television receiver is compatible with an external source of alternating current and a source of direct current such as battery disposed therein, the invention can be realized with an arrangement as shown in FIG. 9 wherein like reference numerals designate the components identical to those shown in FIG. 6. In FIG. 9, the full-wave rectifier bridge 62—63—64—65 energized by the source 72 of alternating current and a source of direct current or a battery 75 disposed in the receiver are selectively connected to the transistor 20 through a transfer switch 76 which is, in turn, connected to a contact plate 77 through a resistor 78. The contact plate 77 is electrically connected to the receiving antenna 1 through an impedance 79 due to the viewer. In other respects, the arrangement is substantially identical to that shown in FIG. 6, although parts are omitted in FIG. 9. In FIG. 9 it will be seen that with the switch 76 thrown on the side of the source 72, the viewer can touch the antenna 1 to connect it to ground through the impedance 29 whereby the switch circuit 17 can be put in operation as in the arrangement of FIG. 6. However, with the switch 76 thrown on the side of the battery 75, the switch circuit 17 can not be operated even through the viewer touches the antenna 1 to connect it to ground through the impedance 29. In order to operate the switch circuit 17 under these circumstances, the contact plate 77 has been provided. More specifically where the switch has been thrown on the side of the battery 75 disposed in the receiver and if the viewer touches the contact plate 77 with one of the hands and grasps the antenna 1 with the other hand then a direct current flows through the following current path:

battery 75 — resistor 78 — contact plate 77 —
impedance 79 — antenna 1 — resistor 18 —
switch circuit 17 — point of reference potential
or chassis for the receiver — battery 75.

This permits the switch circuit 17 to be put in operation. In this way an automatic contact switch has been provided.

It is practical that the contact plate 77 may form a part of an ornamental panel disposed on the front face of a television receiver or of a handle attached to a portable television receiver or the like.

From the foregoing it will be appreciated that the invention has provided television receivers including the circuit for displaying the field strength at a receiving antenna involved, adapted to be put in operation by touching the antenna by the viewer. However it is noted that if such a display circuit is connected directly to an input circuit to a tuner for the receiver, that various problems may be encountered. To avoid those problems, the capacitor designated by the reference numeral 19 in FIG. 2 has been provided and will now be described in conjunction with FIG. 10 wherein like reference numerals designate the components identical or corresponding to those shown in FIG. 2.

Figure 10:
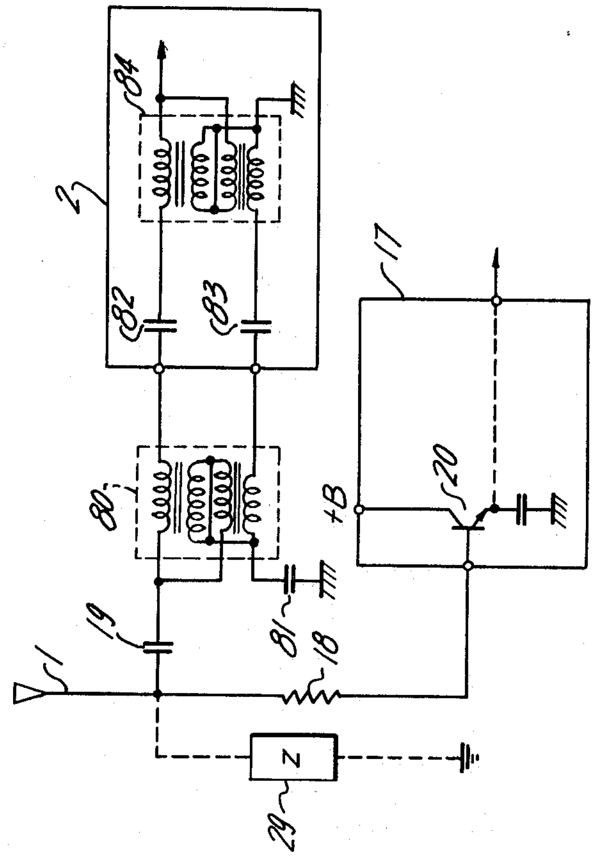
FIG. 10 is a schematic wiring diagram of an input circuit of a receiving antenna constructed in accordance with the principles of the invention.

In FIG. 10, the receiving antenna 1 is connected, in addition to the switch circuit 17 through the resistor 18, to a impedance matching transformer 80 through the abovementioned capacitor 19. The transformer 80 is connected at one end to the point of reference potential as previously described through a capacitor 81 and connected on the output end to the tuner 2. The tuner 2 is shown in FIG. 10 as including a pair of capacitors 82 and 83 connected to the output side of the transformer 80 and also to an input transformer 84. The capacitor 81 along with the capacitors 82 and 83 blocks the antenna 1 from the succeeding receiver circuitry. The capacitor 19 is preselected to have an impedance at the frequency of the commercial source of electric power sufficiently higher than the sum of the input impedance of the switch circuit 17 and the impedance of the high resistor 18.

Before the arrangement of FIG. 10 will be described there is considered the same arrangement not including the capacitor 19. As previously described, the display control circuit is put in operation by means of the impedance 29 relative to ground of the antenna 1 caused by touching the latter by the viewer. This causes the input impedance of the switch circuit for the display control circuit to be very high. As a result, the parallel impedances presented by the capacitors 82, 83 and 81 at the frequency of the commercial source amount to a value not negligible with respect to the sum of the high resistance 18 and the input impedance of the switch circuit 17. Thus a current flowing through the impedance 29 relative to ground upon touching the antenna 1 by the viewer is shunted through the capacitors 81, 82 and 83 resulting in a decrease in that portion of the current flowing through the switch circuit 17. This leads to the necessity of increasing the gain of the switch circuit 17 and therefore to a complicated, expensive construction.

Further, in such an environment that the impedance 29 relative to ground is of a very high magnitude, it has been found that, in spite of the viewer touching the antenna 1 the switch circuit 17 might fail to be operated.

In addition, where the parallel impedances presented by the capacitors 81, 82 and 83 have been chosen to be high to decrease the currents therethrough, those capacitors 81, 82 and 83 are very low in capacitance and therefore the television receiver becomes high in loss of reception. Namely, the tuner 2 has been disadvantageous in that its gain has decreased and so on.

In contrast, the invention comprises the use of the capacitor 19 having a high impedance at the frequency of the commercial source. That impedance determines the impedance of the input circuit to the television receiver. Once the impedance of the capacitor 19 has been selected to have a magnitude sufficiently high as compared with the sum of the high resistance 18 and the input impedance of the switch circuit 17, almost all the current flowing through the impedance 29 relative to ground upon touching the antenna 1 with the viewer flows through the switch circuit 17.

Even in such an environment that the impedance 29 relative to ground has a sufficiently high magnitude, therefore the switch circuit is stably operated.

Considering the effect of the capacitor 19 upon the input circuit to the receiver, the capacitors 81, 82 and 83 are sufficiently high in capacitance that they scarcely contribute to the loss of reception. Although the capacitor 19 causes some loss of reception, such a loss is as low as the loss of reception provided by the capacitors 81, 82 and 83 and the gain of reception does not decrease beyond the above loss.

Figure 12:
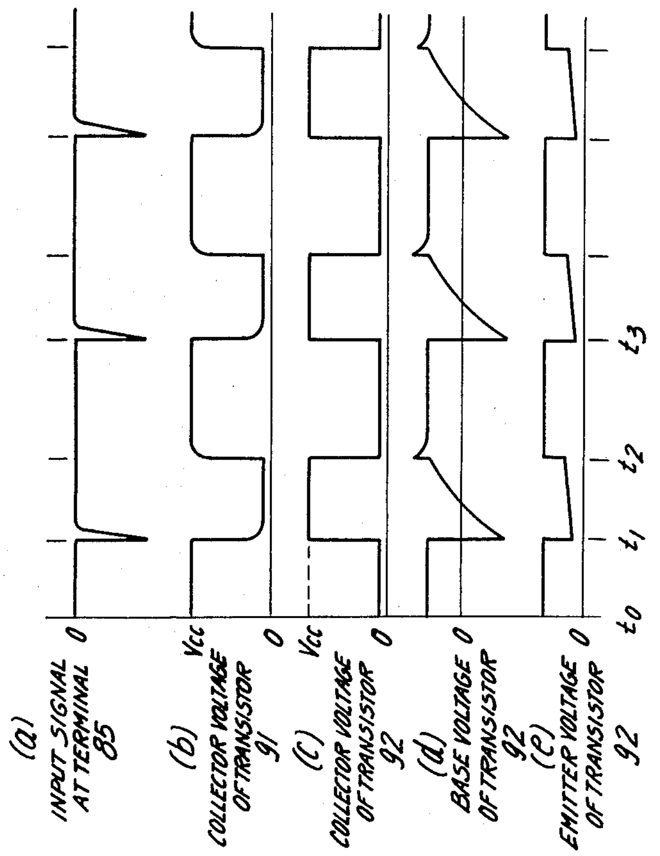
FIG. 12*a* through *e* are graphic representations of waveforms developed at various points on the circuit of FIG. 11.

While the invention has been described in terms of the vertical black band appearing on the picture tube, it is to be understood that the same is equally applicable to the formation of a horizontal black band on the picture tube which will be subsequently described in conjunction with FIGS. 11 through 13.

Figure 11:
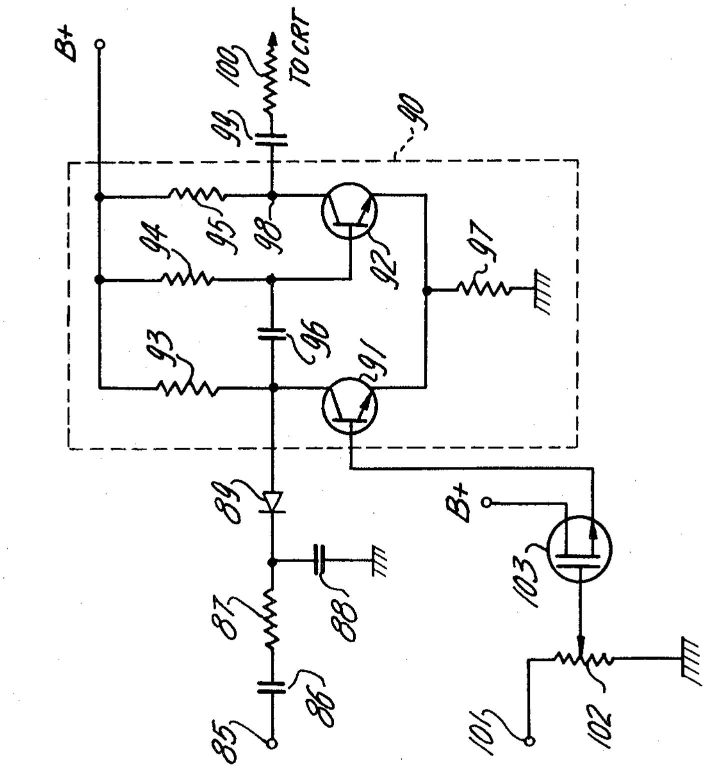
FIG. 11 is a circuit diagram of another modification of the display control circuit.

In FIG. 11 an input terminal 85 is connected through a capacitor 86, resistor 87 and a semiconductor diode 89 to a monostable multivibrator generally designated by the reference numeral 90. With a capacitor 88 connected between the junction of the resistor 87 and the diode 89 and the point of reference potential as previously described. The multivibrator 90 is formed of a pair of transistors 91 and 92 and the associated resistors 93, 94, 95, 97 and capacitor 96 interconnected as shown in FIG. 11. In order to energize the multivibrator 90, a source of direct current (not shown) is connected to the collector electrodes of the transistors 91 and 92 through a terminal B+ and the respective resistors 93 and 95.

Another input terminal 101 is connected to a sensitivity controlling potentiometer 102 connected to ground and including a movable tap connected to a gate electrode of a field effect transistor 103. The field effect transistor 103 includes a source electrode connected through a terminal B+ to a source of direct current (not shown) and a drain electrode connected to the base electrode of the transistor 91.

The multivibrator 90 includes an output 98 provided by the collector electrode of the transistor 92 connected to a capacitor 99 subsequently connected to a cathode or a grid electrode of a picture tube (not shown) through a decoupling resistor 100.

It is now assumed that at a time point of $t_0$ (see FIG. 12) a source switch (not shown) has been turned on to put the arrangement of FIG. 11 in operation. In the absence of an input signal or a vertical blanking pulse at the input terminal 85, the transistor 91 is in its OFF state and the transistor 92 is in its ON state. In that quiescent state, the capacitor 96 is charged to a potential substantially equal to that at the terminal B+ on the side of the transistor 91 collector and to a potential substantially equal to that at the base electrode of the transistor 92 on the other side. Then a vertical blanking pulse will be applied to the input terminal 85 at a time point of $t_1$ as shown in FIG. 12*a*. After having been voltage-divided and shaped, that pulse is applied to the multivibrator circuit 90 as a negative triggering pulse serving to decrease the potential at the collector electrode of transistor 91 as shown in FIG. 12*b*. The triggering pulse is applied through the capacitor 96 to the base electrode of the transistor 92 whereupon the potential at that base electrode drops as shown in FIG. 12*d* to decrease a collector current flowing through the transistor 92.

Therefore a potential at the collector electrode of the transistor 92 or at the output 98 of the multivibrator circuit 90 is raised as shown in FIG. 12*c*. Simultaneously potentials of the emitter electrodes of the transistors 91 and 92 begins to decrease due to a decrease in emitter current flowing through the transistor 92 (see FIG. 12*e*). If those emitter potentials are lower than the potential at the base electrode of the transistor 91, the latter is immediately turned on whereupon the transistor 92 is turned off because of a decrease in base potential thereof.

This permits the potential at the terminal B+ to be applied to the output 98 of the multivibrator circuit 90. Then a charge stored on the capacitor 96 discharges through the following current path:

output impedance of transistor 91 — resistor 97— the point reference potential or receiver's chassis — terminal B+ — resistor 94. After having discharged, the capacitor 96 again charges through the same current path just described to increase the potential at the base electrode of the transistor 92 as shown in FIG. 12*c*. When the potential at the base electrode of that transistor 92 exceeds that at the emitter electrode thereof at a time point of $t_2$ (see FIG. 12) the transistor 92 is turned on. Also the emitter current flowing through the transistor 92 causes the potential at the emitter electrode of the transistor 91 to increase until no base current flows through the transistor 91 to turn the latter off. Thus the potential at the output 98 of the multivibrator 90 is caused to decrease due to a flow of collector current through the transistor 92 until multivibrator is restored to its original state.

Then the succeeding blanking pulse is applied to the input terminal 85 at a time point of $t_3$ (see FIG. 12) to repeat the process as above described.

On the other hand, an AGC voltage is applied to the input terminal 101 to vary the potential at the collector electrode of the transistor 91 through the base potential thereof. This changes the initial level of potential at the base electrode of the transistor 92 (see FIG. 12*d*) thereby to change a time interval of from $t_1$ to $t_2$ between the application of the vertical blanking pulse and the turning on of the transistor 92.

In this way the multivibrator 90 produces pulses of rectangular waveform as shown in FIG. 12*c*. Those pulses are applied to the capacitor 99 where the direct current component thereof is removed. Thereafter the pulses are supplied through the decoupling resistor 100 to the associated picture tube (not shown). Thus the signal as shown in FIGS. 12*c* is displayed on the screen of the tube (not shown).

Figure 13:
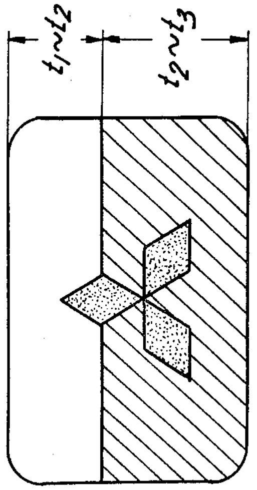
FIG. 13 is a view of a display on a screen of a cathode ray tube provided by the circuit shown in FIG. 11.

Assuming that the blanking pulse as above described is extracted from the conventional vertical synchronizing signal, the associated picture tube produces the associated picture tube produces on its screen a pattern including two horizontal portions different in brightness from each other as shown in FIG. 13. The brighter portion of the pattern corresponds to a first portion of the vertical deflection period such as the time interval of from $t_o$ to $t_1$ for which the rectangular pulses as shown in FIG. 12*c* are applied to the picture tube. The less bright or dim pattern portion corresponds to the remaining portion of the vertical deflection period such as the time interval of from $t_2$ to $t_3$ for which such rectangular pulses are not applied to the picture tube.

Under these circumstances the particular receiving antenna can be moved to change the field intensity thereat. If the movement of the antenna causes the field intensity to increases, the resulting AGC voltage also increase in magnitude. Therefore the field effect transistor 103 increases in gate voltage while it increases in output voltage. As a result, the transistor 91 increases in collector voltage and the transistor 92 also increases in base voltage until the base voltage reaches that level at which the capacitor 96 is initiated to charge and discharge. In other words the transistor 92 results in its turning on earlier as the antenna is moved. This causes a decrease in conduction time ($t_1 - t_2$) of the transistor 92 to narrow the brighter portion of the particular pattern displayed on the associated picture tube.

If it is desired to know the position for the best reception of the antenna the arrangement of FIG. 11 is first put in operation and then while the picture tube is viewed the antenna is moved so that the resulting pattern on the tube becomes narrowest in the brighter portion displaced during the time interval of $t_1$ to $t_2$. At that time the antenna is stopped and fixed at its position corresponding to a minimum height of the narrowest brighter brighter portion of the pattern on the tube. Then the arrangement of FIG. 11 is rendered inoperative after which the pictures on the picture tube can be viewed in the best reception.

In summary, the invention provides a device for visually displaying the field intensity at a receiving antenna involved including means for producing a signal dependent upon the field intensity, and supplying the signal to the associated picture tube to display it thereon, so that the position for the best reception of the antenna is readily determined by the display on the tube. Therefore the invention has great utility. Also the present device can be extremely simply operated because it is adapted to be put in operation when the viewer is touching the receiving antenna. Further the device is arranged not to adversely affect the input circuit to the television receiver.

While the invention has been illustrated and described in conjunction with a few preferred embodiments thereof, it is to be understood that numerous changes and modifications may be resorted to without departing from the spirit and scope of the invention. For example, instead of an AGC voltage, a voltage supplied to the video IF amplifier may be utilized as a measure of a field intensity at a receiving antenna involved. Also the display on the picture tube may be a change in brightness of the picture or of the width of the raster on the picture tube.

What we claim is:

1. In a television receiver having a receiving antenna for receiving electromagnetic radiation from broadcasting stations, a tuner for tuning to a desired one of the broadcasting stations, a video circuit having a video IF amplifier, a video detector and video amplifier for converting a signal from the tuner to a predetermined signal, a cathode ray tube, means for supplying the predetermined signal to the cathode ray tube and a deflection circuit for scanning the screen of the cathode ray tube and an AGC circuit for detecting the output of the video amplifier and applying a detected output to both said tuner and video if amplifier, the improvement which comprises a combination of a switch circuit including a touch-responsive electric circuit having an impedance caused by touching of said antenna by a human thereby to provide an output, a display control circuit responsive to said output from said switch circuit and having means coacting with the amplitude variation of an AGC voltage output of said AGC circuit in response to field intensity variation at said antenna, means for applying said AGC voltage output to said display control circuit to produce an output signal representative of the field intensity of the radiation received at said receiving antenna and varying in accordance with said intensity, and means for supplying said output signal from said display control circuit to said video circuit for display on said cathode ray tube, whereby the optimum directivity of the antenna may be determined by positioning said antenna as a function of the signal displayed on said cathode ray tube and thereby optimize reception of the transmissions of broadcasts.

2. A television receiver as claimed in claim 1 including means to apply to said display control circuit as said input thereto an AGC voltage, said deflection circuit having means for generating positive and negative pulses and means to apply to said display control circuit at least one of a pulse with positive polarity and a pulse with negative polarity generated by said deflection circuit.

3. A television receiver as claimed in claim 1 including an impedance matching transformer between said antenna and said tuner, and a capacitor connected between said receiving antenna and said impedance matching transformer.

4. In a television receiver having a receiving antenna for receiving electromagnetic radiation from broadcasting stations, a tuner for tuning to a desired one of the broadcasting stations, a video circuit having an video IF amplifier, video detector and video amplifier for converting a signal from the tuner to a predetermined signal, a cathode ray tube, means for supplying the predetermined signal to the cathode ray tube, and a deflection circuit for scanning the screen of the cathode ray tube and an AGC circuit for detecting the output of the video amplifier and applying a detected output to both said tuner and video IF amplifier, said deflection circuit having means for generating positive and negative pulses, the improvement which comprises in combination a source circuit for supplying electric power to said television receiver, including a source of alternating current connected to ground, and a rectifier circuit for rectifying the output from said source to provide a direct current voltage, a switch circuit including a resistor having a high magnitude of resistance, a transistor connected to said receiving antenna, through said resistor having a high magnitude of resistance, a chassis for the receiver, means connecting said transistor to said chassis, said switch circuit including a touch-responsive electric circuit having an impedance caused by touching said receiving antenna with a human viewer to provide an output, a display control circuit operative in response to said output from said switch circuit coacting with the amplitude variation of an AGC voltage output of said AGC circuit in response to field intensity variation at said antenna, means for applying said AGC voltage output to said display control circuit to produce an output signal representative of the field intensity of the radiation received at said receiving antenna and varying in accordance with said intensity, and means for supplying said output signal from said display control circuit to said video circuit for display on said cathode ray tube, whereby the optimum directivity of the antenna may be determined by positioning said antenna as a function of the signal displayed on said cathode ray tube and thereby optimize reception of the transmissions of broadcasts.

5. A television receiver as claimed in claim 4 in which said source circuit consists of a source of direct current having a contact plate connected thereto, a resistor having a high magnitude of resistance connected between said source and said contact plate.

* * * * *